US010671590B2

(12) United States Patent
Lindem, III et al.

(10) Patent No.: US 10,671,590 B2
(45) Date of Patent: Jun. 2, 2020

(54) DELTA DATABASE SYNCHRONIZATION

(71) Applicant: CISCO TECHNOLOGY, INC., San Jose, CA (US)

(72) Inventors: Alfred C. Lindem, III, Cary, NC (US); Keyur Patel, San Jose, CA (US); Abhay Roy, Cupertino, CA (US); Derek Man-Kit Yeung, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 254 days.

(21) Appl. No.: 15/254,943

(22) Filed: Sep. 1, 2016

(65) Prior Publication Data

US 2017/0344594 A1 Nov. 30, 2017

Related U.S. Application Data

(60) Provisional application No. 62/342,621, filed on May 27, 2016.

(51) Int. Cl.
*G06F 16/00* (2019.01)
*G06F 16/23* (2019.01)
(Continued)

(52) U.S. Cl.
CPC ........ *G06F 16/2329* (2019.01); *G06F 16/273* (2019.01); *G06F 16/275* (2019.01); *H04L 67/1095* (2013.01)

(58) Field of Classification Search
CPC ......... H04L 45/22; H04L 45/04; H04L 45/32; H04L 45/025; H04L 45/14; H04L 45/54;
(Continued)

(56) References Cited

U.S. PATENT DOCUMENTS 7,248,579 B1 7/2007 Friedman
7,391,730 B1 * 6/2008 Chandra ................. G06F 16/27
370/236
(Continued)

FOREIGN PATENT DOCUMENTS

WO WO-2013071428 A1 * 5/2013 ......... H04L 67/1095
WO WO-2016095356 A1 * 6/2016

OTHER PUBLICATIONS

Lindem, A., et al., "OSPFv3 LSA Extendibility," Network Working Group Internet Draft, draft-ietf-ospf-ispfv3-lsa-extend-10.txt, May 23, 2016; 32 pages.
(Continued)

*Primary Examiner* — Augustine K. Obisesan

(57) ABSTRACT

Aspects of the embodiments are directed to synchronizing at least a portion of a link-state database. A network element can lose an adjacency. The network element can transmit a request to a neighboring network element for synchronization of a link-state database. The request can include a version number of a last synchronized link-state database from the neighboring network element. The neighboring network element can determine whether the version of the link-state database is greater than or less than a copy of the link-state database stored by the neighboring network element. If the requested version number is less than the neighboring network element's link-state database version number, then the neighboring network element can send changes to the link-state database since the requested link-state database version number.

14 Claims, 7 Drawing Sheets

(51) Int. Cl.
 *H04L 29/08* (2006.01)
 *G06F 16/27* (2019.01)
(58) Field of Classification Search
 CPC ..... H04L 45/60; H04L 45/123; H04L 45/245; H04L 45/08; H04L 45/24; G06F 11/0793; G06F 17/30356; G06F 17/30581; G06F 17/30952; G06F 2009/45595; G06F 9/45558
 See application file for complete search history.

(56) References Cited

U.S. PATENT DOCUMENTS

| | | | | |
|---|---|---|---|---|
| 7,961,601 | B2* | 6/2011 | Lu | H04L 45/02 370/225 |
| 8,149,690 | B1* | 4/2012 | Kakkar | H04L 45/00 370/219 |
| 9,210,067 | B1* | 12/2015 | Agarwal | H04L 45/22 |
| 2003/0123457 | A1* | 7/2003 | Koppol | H04L 45/02 370/400 |
| 2007/0127457 | A1 | 6/2007 | Mirtorabi et al. | |
| 2009/0046579 | A1* | 2/2009 | Lu | H04L 45/02 370/225 |
| 2009/0161531 | A1* | 6/2009 | Chen | H04L 41/00 370/216 |
| 2010/0027555 | A1* | 2/2010 | Fu | H04L 45/00 370/401 |
| 2010/0208622 | A1* | 8/2010 | Saleh | H04L 12/66 370/255 |
| 2011/0022728 | A1* | 1/2011 | Kern | H04L 45/02 709/242 |
| 2013/0070604 | A1* | 3/2013 | Lu | H04L 45/586 370/238 |
| 2013/0073741 | A1* | 3/2013 | Lindem, III | H04L 45/12 709/232 |
| 2014/0269407 | A1* | 9/2014 | Anand | H04L 45/02 370/254 |
| 2019/0132232 | A1* | 5/2019 | Ammireddy | H04L 45/02 |

OTHER PUBLICATIONS

Ogier, R., et al., "Mobile Ad Hoc Network (MANET) Extension of OSPF Using Connected Dominating Set (CDS) Flooding," Network Working Group RFC 5614, Aug. 2009; 71 pages.
Ogier, R., "OSPF Database Exchange Summary List Optimization," Network Working Group RFC 5243, May 2008; 5 pages.

* cited by examiner

DELTA DATABASE SYNCHRONIZATION

CLAIM OF PRIORITY APPLICATION

This application claims the benefit of priority under 35 U.S.C. 119(e) to U.S. Provisional Application Ser. No. 62/342,621, entitled "DELTA DATABASE SYNCHRONIZATION," filed May 27, 2016. The disclosure of the prior applications are considered part of (and are incorporated by reference in) the disclosure of this application.

FIELD

This disclosure pertains to database synchronization between adjacent network elements.

DISCUSSION OF THE CONTEXT

In interior gateway protocols (IGPs), such as open shortest path first (OSPF) and intermediate system to intermediate system (IS-IS), it has been necessary to synchronize link-state databases each time an adjacency is formed. With the introduction of software-defined networking (SDN) controller-based architectures, there may be similar requirements for synchronization of databases between a controller and its clients. However, in these topologies the controller may be required to synchronize a database with thousands of clients. Additionally, the re-synchronization of the complete database is done each time an adjacency is lost resulting in significant overhead. The idea proposed in this invention helps eliminate the described overhead by modifying IGP protocols to generate and announce incremental updates whenever possible.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DETAILED DESCRIPTION

Figure 1A:
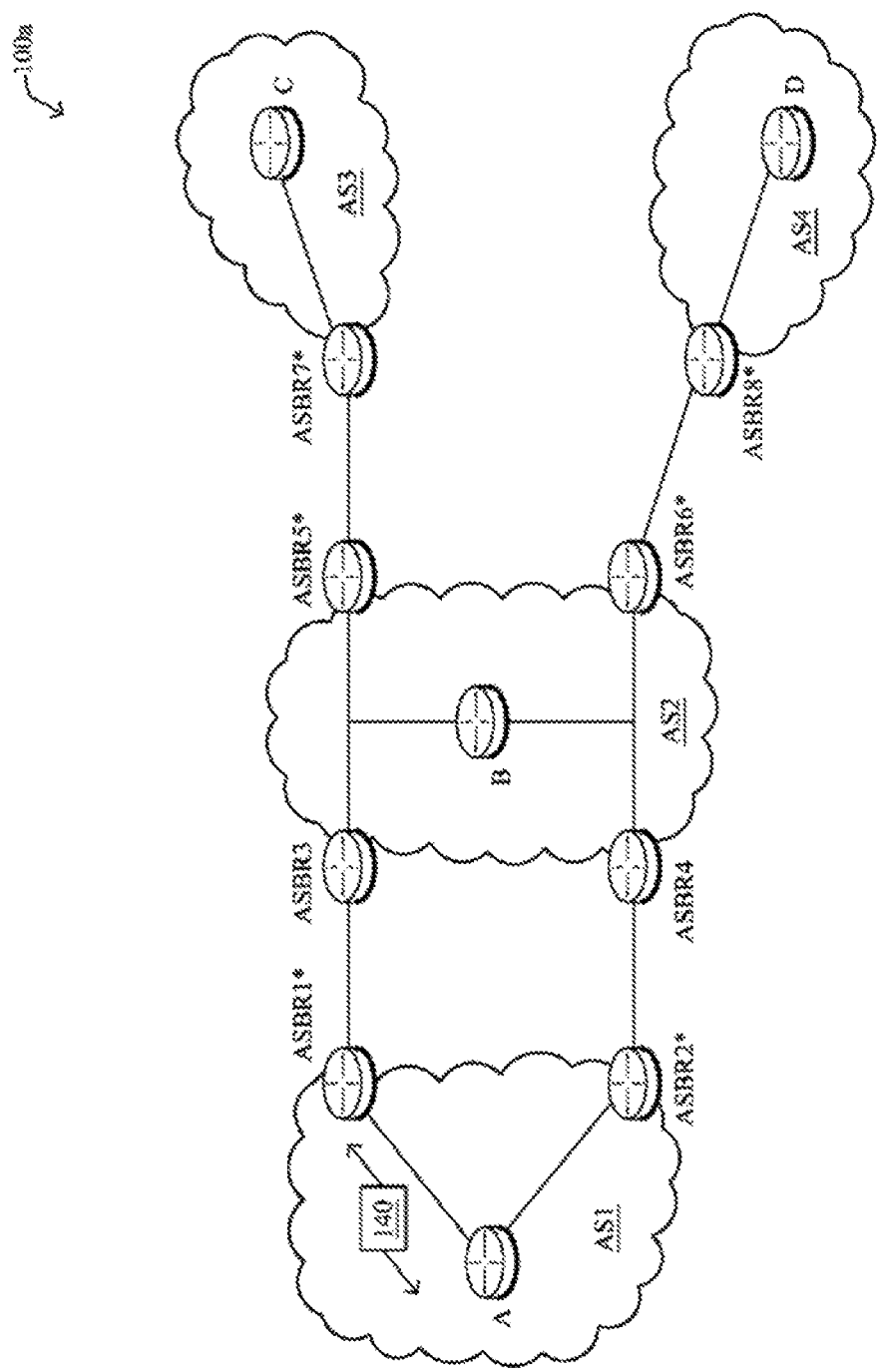
FIGS. 1A and 1B are schematic diagrams of computer networks.

Aspects of the embodiments are directed to a computer-readable non-transitory medium comprising one or more instructions for synchronizing a link-state database. The instructions when executed on a processor are operable to associate a version number with a local link-state database; receive a request from a neighboring network element for an update to the neighboring element's link-state database, the request comprising a version number for the last version of the local database synchronized by the neighboring network element; compare the version number of the local link-state database with the version number of the neighboring network element's requested version; determine whether the neighboring network element's synchronized version is older than the local link-state database; and transmit to the neighboring network element one or more changes that have occurred in the local link-state database as compared to the neighboring element's synchronized version of the local database.

Aspects of the embodiments are directed to a network element, the network element comprising at least one memory element having instructions stored thereon. The network element can also include at least one processors coupled to the at least one memory element and configured to execute the instructions to cause the network element to associate a version number with a local link-state database; receive a request from a neighboring network element for an update to the neighboring element's link-state database, the request comprising a version number for the last synchronized local link-state database; compare the version number of the local link-state database with the version number requested by the neighboring network element; determine whether the neighboring network element's requested version is older than the local link-state database; and transmit to the neighboring network element one or more changes that have occurred in the local link-state database as compared to the neighboring element's last synchronized version of the local link-state database.

Aspects of the embodiments are directed to a method performed at a network element, the method including associating a version number with a local link-state database; receiving a request from a neighboring network element for an update to the neighboring element's link-state database, the request comprising a version number for the neighboring element's last synchronized version of the local link-state database; comparing the version number of the local link-state database with the version number of the neighboring network element's last synchronized version of the local link-state database; determining whether the neighboring network element's last synchronized version of the local link-state database is older than the local link-state database; and transmitting to the neighboring network element one or more changes that have occurred in the local link-state database as compared to the neighboring element's last synchronized version of the local database based on the neighboring network element's requested version being older than the local link-state database.

Some embodiments also include determining that the neighboring network element's synchronized version of the local database is newer than the local link-state database; and transmitting the full local database to the neighboring network element for synchronization.

Some embodiments also include receiving an update to the local link-state database; updating the local link-state database with the update; incrementing the version number; and associating the version number with the updated local link-state database.

Some embodiments also include determining that the neighboring network element's requested version is older than the local link-state database based on the version number associated with an updated local link-state database; and transmitting the one or more changes to the neighboring network element's link state database to the neighboring network element.

Some embodiments also include retaining a last-deleted link state database; maintaining one or more last-deleted link state database elements for a predetermined time interval;

and storing a version number for a link state database that included a most recent last-deleted link state database element to time-out.

Some embodiments also include determining that the last-deleted link state database element has timed-out based on the predetermined time interval for maintaining the last-deleted link state database element being elapsed; identifying the version number of the database associated with the most recent last-deleted link state database element to time-out; determining that the requested link-state database version is greater than the version number of the link state database associated with the most-recent last-deleted database element to time out; and transmitting to the neighboring network element the one or more changes that have occurred in the local link-state database as compared to the neighboring element's synchronized version of the local database.

Aspects computer-readable non-transitory medium including one or more instructions for synchronizing a link-state database, the instructions when executed on a processor are operable to determine that an adjacency to a neighboring network element has been lost; transmit, to the neighboring network element, a request for synchronization of a link-state database, the request comprising an identification of a version number of the last synchronized version of the neighboring element's link-state database; receive, from the neighboring network element, at least a portion of an updated link-state database; and synchronize the local link-state database with the at least a portion of the updated link-state database.

Aspects of the embodiments are directed to a method that includes determining that an adjacency to a neighboring network element has been lost; transmitting, to the neighboring network element, a request for synchronization of a link-state database, the request comprising an identification of a version number of a last synchronized version of the neighboring element's link-state database; receiving, from the neighboring network element, at least a portion of an updated link-state database; and synchronizing the local link-state database with the at least a portion of the updated link-state database.

Some embodiments also include receiving a whole updated link-state database; and synchronizing the entire local link-state database with the whole updated link-state database.

Some embodiments also include that the at least a portion of the updated link-state database comprises changes to the local link-state database version, and wherein the instructions when executed on a processor are operable to synchronize the local link-state database with the changes to the local link-state database version.

Open Shortest Path First (OSPF) is a routing protocol developed for Internet Protocol (IP) networks. OSPF is a link-state routing protocol that calls for the sending of link-state advertisements (LSAs) to all other routers within the same hierarchical area. Information on attached interfaces, metrics used, and other variables, is included in OSPF LSAs. As OSPF routers accumulate link-state information, they use algorithms that calculate the shortest path to various routers (network nodes). The largest entity within the hierarchy is an autonomous system (AS), which is a collection of networks under a common administration that share a common routing strategy. OSPF is an intra-domain routing protocol. A routing domain can be divided into a number of areas, which are groups of contiguous networks and attached hosts. Routers with multiple interfaces can participate in multiple areas. These routers, which are called Area Border Routers, maintain separate topological databases for each area. A topological database is essentially an overall picture of networks in relationship to routers. The topological database contains the collection of LSAs received from all routers in the same area. Because routers within the same area share the same information, they have identical topological databases.

The Shortest Path First (SPF) routing algorithm is the basis for OSPF operations. When a router using the SPF algorithm is powered up, it initializes its routing-protocol data structures and then waits for indications from lower-layer protocols that its interfaces are functional. After a router is assured that its interfaces are functioning, it uses the OSPF Hello protocol to acquire neighbors, which are routers with interfaces to a common network. The router sends hello packets to its neighbors and receives their hello packets. In addition to helping acquire neighbors, hello packets also act as "keepalives," messages that let routers know that other routers are still functional. On multi-access networks (networks supporting more than two routers), the Hello protocol elects a designated router and a backup designated router. Among other things, the designated router is responsible for generating LSAs for the entire multi-access network. Designated routers allow a reduction in network traffic and in the size of the topological database.

When the topological databases of two neighboring routers are synchronized, the routers are said to be adjacent. Adjacencies control the distribution of routing-protocol packets, which are sent and received only on adjacencies. Each router periodically sends its LSAs to provide information on a router's adjacencies or to inform others when a router's state changes. By monitoring link state, failed routers can be detected quickly, and the network's topology can be altered appropriately. From the topological database generated from LSAs, each router calculates a shortest-path tree (SPT), with itself as root. The SPT, in turn, yields a routing table.

FIG. 1A is a schematic block diagram of an exemplary computer network 100a that includes autonomous system (AS) AS2 102, which is interconnected with a plurality of other autonomous systems AS1 104, AS3 106, and AS4 108. An Autonomous System (AS) is herein defined to be a group of intermediate nodes, such as routers, within a network that are subject to a common authority and execute one or more routing protocols. Although, each AS is illustratively an autonomous system, those skilled in the art will appreciate that the ASes may be configured as routing domains or other networks or subnetworks. The autonomous system AS1 104 includes routers such as AS boundary routers ASBR1* 112 and ASBR2* 114 through which communication, such as through data packet transmission, may pass into and out of the autonomous system to routers ASBR3 116 and ASBR4 118, respectively of AS2 102. AS2 102 also includes routers ASBR5* 120 and ASBR6* 122 in communication with routers ASBR7* 124 AS3 106 and ASBR8* 126 of AS4 108, respectively. Moreover, within AS1 104, AS2 102, AS3 106, and AS4 108, there are exemplary routers A 134, B 132, C 136, and D 138, respectively. An Inter-Domain protocol, such as Border Gateway Protocol (BGP), is used exchange routing information between ASes.

Figure 1B:
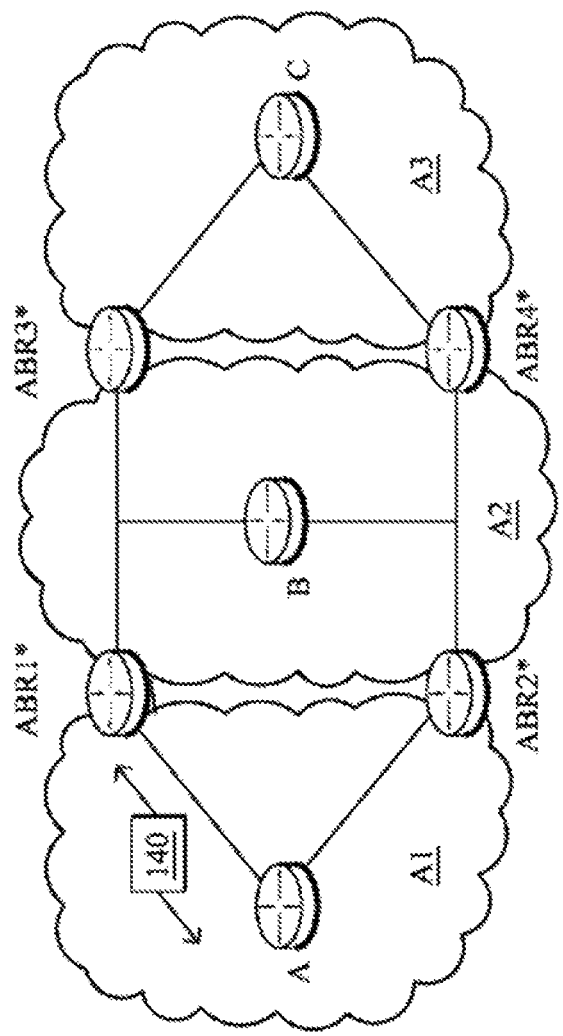

Alternatively or in addition, FIG. 1B is a schematic block diagram of an exemplary computer network 100b comprising areas A1 152, A2 154, and A3 156, each having at least one router, A 162, B 164, and C 166, respectively. In particular, A1 152 and A2 154 share routers ABR1* 172 and ABR2* 174, while A2 154 and A3 156 share ABR3* 176 and ABR4* 178. As used herein, an area is a collection of routers that share full network topology information with each other but not necessarily with routers outside the area. The term area as used herein also encompasses the term "level" which has a similar meaning for networks based on their chosen routing protocol.

Data packets 140 (e.g., discrete frames or packets of data) may be exchanged among the nodes/devices of the computer network (such as networks 100a and 100b) using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. In this context, a protocol consists of a set of rules defining how the nodes interact with each other. For example, in addition to user data, routing information may be distributed among the routers within an AS (e.g., between areas A1-A3) using pre-determined "interior" gateway protocols (IGPs), such as conventional distance-vector protocols or, illustratively, link-state protocols, through the use of link-state advertisements (LSAs) or link-state packets. Moreover, data packets containing network routing information may be exchanged among the autonomous systems AS1-AS4 using "external" gateway protocols, such as the Border Gateway Protocol (BGP).

Those skilled in the art will understand that any number of nodes, devices, links, etc. may be used in the computer network, and that the view shown herein is for simplicity. Furthermore, the techniques described below with reference to inter-AS path computation may be used in the context of inter-area path computation and, under certain conditions, the techniques described with reference to inter-area path computation may be used for inter-AS path computation.

Figure 2:
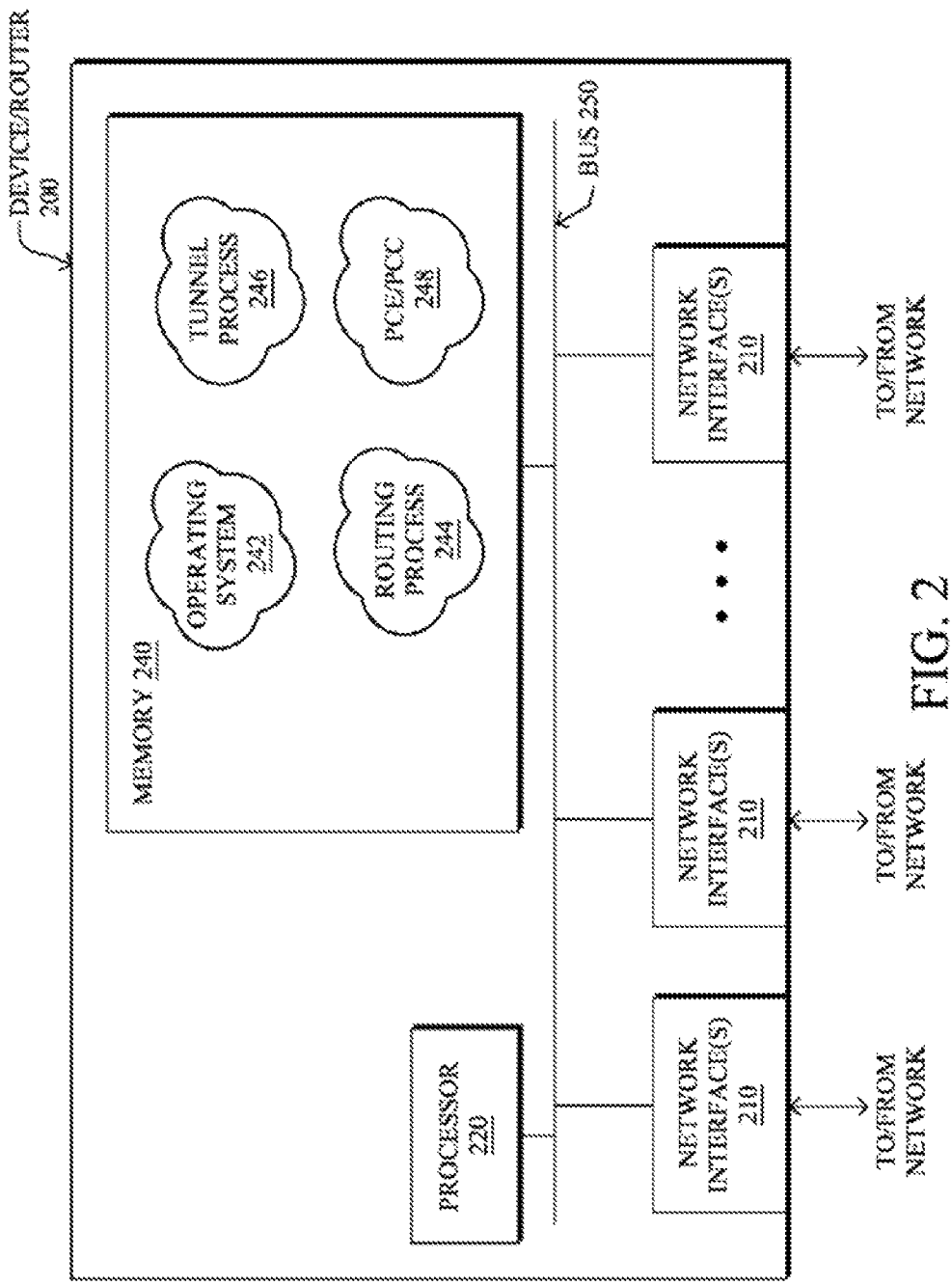
FIG. 2 is a schematic diagram of a network element.

FIG. 2 is a schematic block diagram of an example node/device (e.g., router) 200 that may be used with one or more embodiments described herein, e.g., as any of the devices in FIGS. 1A and 1B above, particularly as a path computation element or client (PCE or PCC) described herein. The device may comprise one or more network interfaces 210, at least one processor 220, and a memory 240 interconnected by a system bus 250.

The network interface(s) 210 contain the mechanical, electrical, and signaling circuitry for communicating data over links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245, such as routing databases/link state databases (LSDBs)/Traffic Engineering databases (TEDs) and or tables. An operating system 242, portions of which are typically resident in memory 240 and executed by the processor, functionally organizes the device by, among other things, invoking operations in support of software processes and/or services executing on the device. These software processes and/or services may comprise routing process/services 244, tunneling process/services 246, and an illustrative PCE/PCC process 248, as described herein. Note that while the processes are shown in centralized memory 240, alternative embodiments provide for certain aspects of the techniques herein to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as the Interior Gateway Protocol (IGP) (e.g., Open Shortest Path First, "OSPF," and Intermediate-System-to-Intermediate-System, "IS-IS") as IGP services, the Border Gateway Protocol (BGP), etc., as will be understood by those skilled in the art. These functions may be configured to manage routing and forwarding information databases/tables (data structures) containing, e.g., data used to make routing and forwarding decisions. Notably, routing processes 244 may also perform functions related to virtual routing protocols, such as maintaining virtual routing/forwarding (VRF) instances (illustratively a component of tables 245) as will be understood by those skilled in the art.

Changes in the network topology within the local domain (network 100) may be communicated among nodes/routers 200 within the network 100 using routing services 244, for example, IGP services such as the conventional OSPF and IS-IS link-state protocols. Suppose, for example, that a communication link fails or a cost value associated with a network node changes. Once the change in the network's state is detected by one of the routers, that router may flood an IGP (or BGP) advertisement (message/packet 140) communicating the change to the other routers in the network. In this manner, each of the routers eventually "converges" to an identical view of the network topology.

Figure 3A:
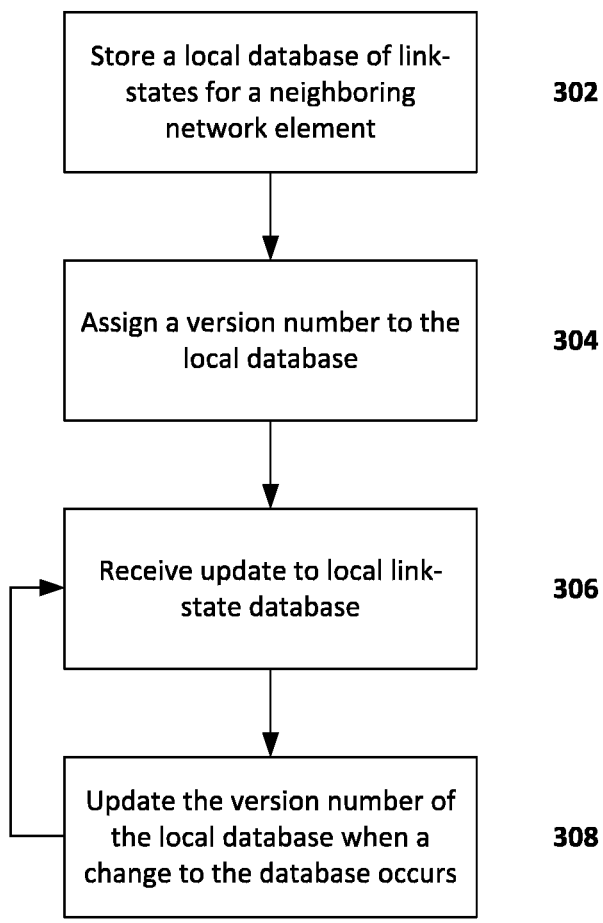
FIGS. 3A-3B are process flow diagrams for selectively synchronizing for adjacency set up in accordance with embodiments of the present disclosure.
Figure 3B:
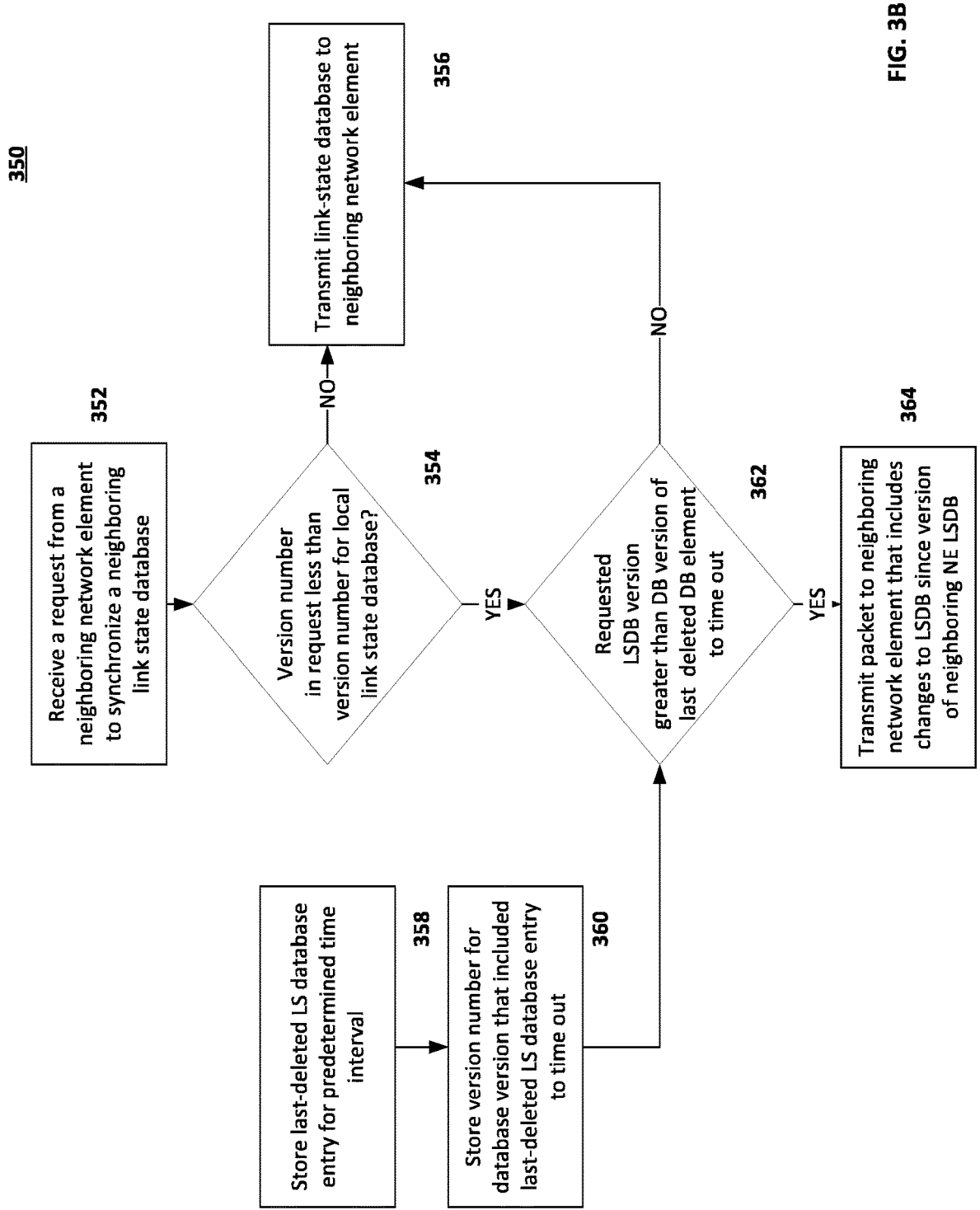

FIGS. 3A-3B are process flow diagrams for synchronizing databases between adjacent network elements. This disclosure describes database synchronization that allows for the re-synchronization of link-state or other software defined networking (SDN) state databases by only synchronizing state (link or otherwise) that changed since the last time the adjacency partners had a functional adjacency. In this disclosure, adjacency partners can be referred to as neighbors or neighboring network elements.

FIG. 3A is a process flow diagram 300 for a network element to associate a version number with a network element's link-state database (LSDB) in accordance with embodiments of the present disclosure. A network element is usually a router. The network element can store a link state database locally for network elements (302). The network element can assign or associate a version number to the locally stored link-state database (304). The network element can receive an update to the locally stored link-state database from neighboring network elements (306). The network element can assign a new version number to the link-state database as previous versions are updated (308).

FIG. 3B is a process flow diagram 350 for a network element to provide link-state database information to a neighboring network element to synchronize the neighboring network element in accordance with embodiments of the present disclosure. A neighboring network element can, for various reasons, lose its adjacency with the network element. The network element can receive, from the neighboring network element, a request to synchronize the neighboring network element's link-state database (352). The request can include an indication of the neighboring element's link-state database version number for the network element (e.g., a value known as AdjacencyLastVersionReceived).

The network element can determine whether the neighboring network element's version number received in the request (AdjacencyLastVersionReceived) is less than the version number of the locally stored link-state database associated with the neighboring network element (354). If the neighboring network element's version number received in the request (AdjacencyLastVersionReceived) is greater than the locally stored version number, then the network element must synchronize its entire link-state database (356).

If the neighboring network element's version number received in the request (AdjacencyLastVersionReceived) is less than the locally stored version number, then the network element can provide the neighboring network a packet or packets that include the changes to the neighboring network element's current version link state database (364).

In embodiments, the network element can retain a last-deleted link state database element and maintain the last-deleted link state database element for a predetermined time interval (358). The network element can store a version number for a link state database that included the last-deleted link state database element (360).

For example, the network element can determine that the last-deleted link state database has timed-out based on the predetermined time interval for maintaining the last-deleted link state database element being elapsed. The network element can identify the version number of the database associated with the last-deleted link state database element.

Prior to transmitting the changes to the neighboring network element's current version link-state database, the network element can determine whether the requested link-state database version is greater than the last deleted database element to time out and be removed from a list of deleted database elements (DatabaseDeletionLastLostVersion) (362). If this checking succeeds, only the delta database changes need be synchronized (364). Otherwise, the adjacency formation process must revert to full database synchronization (356).

Figure 4:
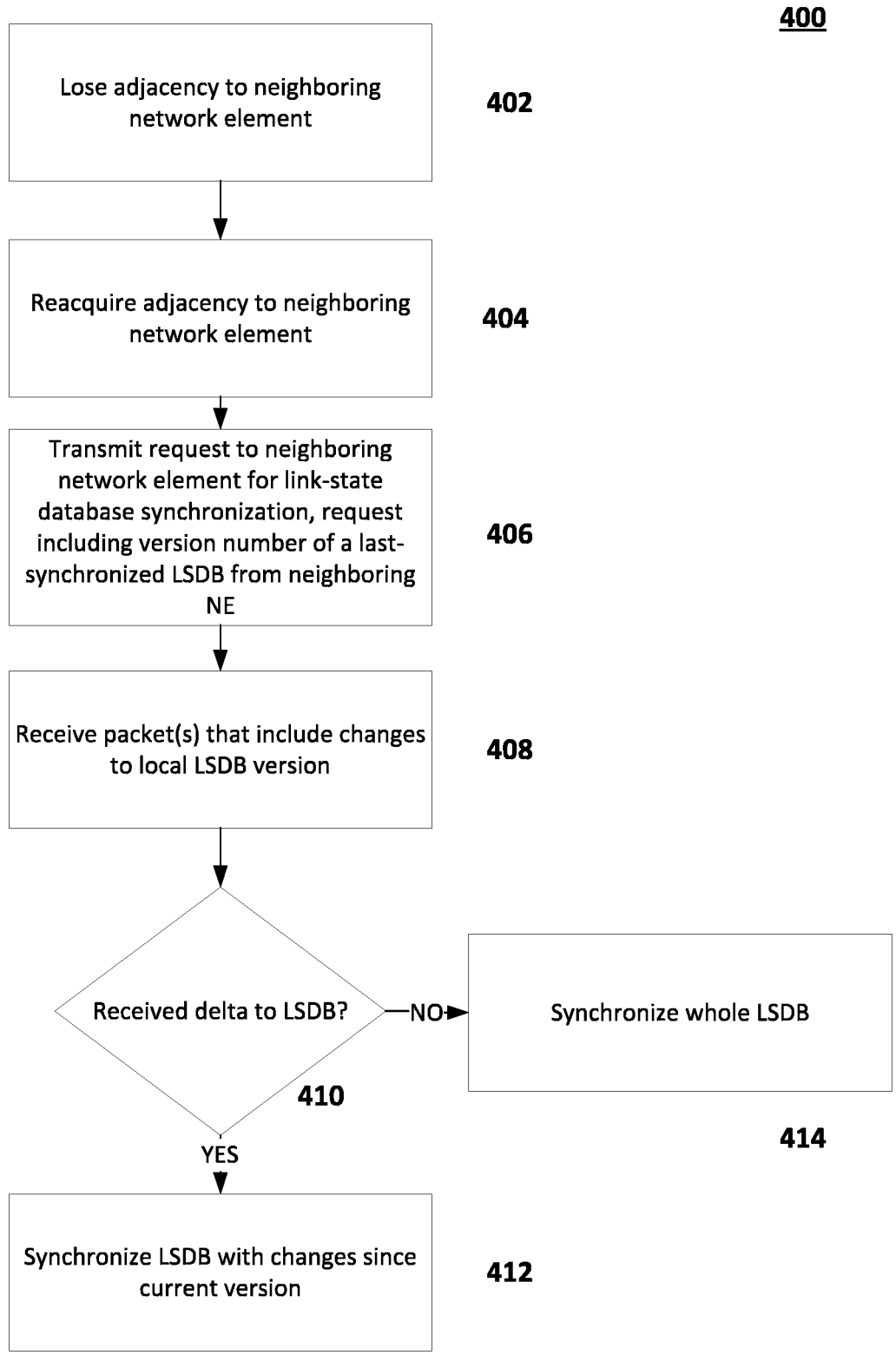
FIG. 4 is a process flow diagram for synchronizing a link-state database in accordance with embodiments of the present disclosure.

FIG. 4 is a process flow diagram for a network element to synchronize a link-state database in accordance with embodiments of the present disclosure. A network element can determine that it has lost an adjacency with a neighboring network element (or multiple network elements) (402). The adjacency to the neighboring network element can be reacquired (404). The network element can transmit, to the neighboring network element, a request to synchronize a local link-state database (406). The request can include a version number of the last link-state database synchronized from the neighboring network element.

The network element can receive, from the neighboring network element, at least a portion of an updated link state database (408).

In embodiments, the network element receives changes to the link state database based on an update to the link state database stored by the neighboring network element. The network element can determine whether to synchronize the local link-state database using the changes, or whether to synchronize the entire local link-state database (410).

If the network element determines to synchronize the changes, the network element performs a delta synchronization to update its local link-state database (412). If the network element determines to synchronize the entire local link-state database, then it undergoes a full synchronization (414).

Aspects of the embodiments can be summarized as follow:

Each adjacency forming network device maintains a local version for their database. This value is purely local and increases for each change to the database. It is an unsigned strictly increasing integer.

During the normal maintenance of the adjacency, all updates are tagged with the corresponding local version number. An acknowledgment may also be tagged with a local version number update indicating the version of an accepted change.

Along with the rest of adjacency state, the last version received from the neighbor is maintained. This is value is known as AdjacencyLastVersionReceived. No attempt is made to maintain the last local version successfully sent to the neighbor.

When a neighbor adjacency is lost, an abbreviated version of the adjacency state is retained for a configurable interval. This state will include the AdjacencyLastVersionReceived. This configurable interval is known as the AdjacencyStateRetentionInterval.

Since deletions to the databases must also be reflected incrementally, these must be retained for correct delta database synchronization. This configurable interval is known as the DatabaseDeletionRetentionInterval. It should be at least as large as AdjacencyStateRetentionInterval.

Additionally, the database version must be retained for the last database element to time out and be removed from the database. This value is known as the DatabaseDeletionLastLostVersion to avoid missing deletions during delta database synchronization.

When an adjacency is to be formed and the databases must be synchronized, a network device implementing this technique will first check for previous adjacency state. If state exists, it will attempt to only synchronize the changes since AdjacencyLastVersionReceived.

Upon receiving a request for delta synchronization, the adjacency will check to ensure that the current database version is greater than the version requested and that it is greater than DatabaseDeletionLastLostVersion. If this checking succeeds, only the delta database changes need be synchronized. Otherwise, the adjacency formation process must revert to full database synchronization.

It should be noted that delta database synchronization negotiation is asymmetric. In other words, delta synchronization of neighbor A's database to neighbor B is independent of whether delta synchronization may be utilized for B's database to neighbor A.

Note that in this context, version comparison is based on wheel arithmetic with ½ the total version number space being the threshold for the when comparison. In other words, the current version is greater than the requested version as long as the difference between two versions is less than half the total version space. This will prevent version wrap from totally disabling the delta database synchronization.

The disclosure may be applied to multiple databases where there is a unique version per database. For example, in OSPFv2 and OSPFv3 there should be a separate version maintained at the AS, area, and link level. This is at the expense maintaining and exchanging multiple version numbers for multiple levels.

Some IGPs, for example OSPF, allow for selective acknowledgement of pieces of the database (i.e., LSAs). In these cases, the fact that version X has been successfully synchronized does not always imply that all versions less than X have been synchronized. For these protocols, only versions received in order can be accepted for Adjacency-LastVersionReceived unless the sender knows for certain that the receiver has all previous database versions. In this case, the sender will flag the version as implicitly acknowledging all previous versions.

Specifically for OSPF, the sender knows that if the retransmission queue is empty when an LSA is added, the version associated with that LSA for that adjacency can acknowledge previous versions.

The adjacency synchronized LSA specified above cannot be signaled in the LSA since it is a property of the adjacency. Rather, it could be signaled using OSPF Link-Local Signalling (LLS) as described in RFC 5614. A similar TLV could be added to the LLS to signal a version that is known to be synchronized including all subsequent versions.

Figure 5:
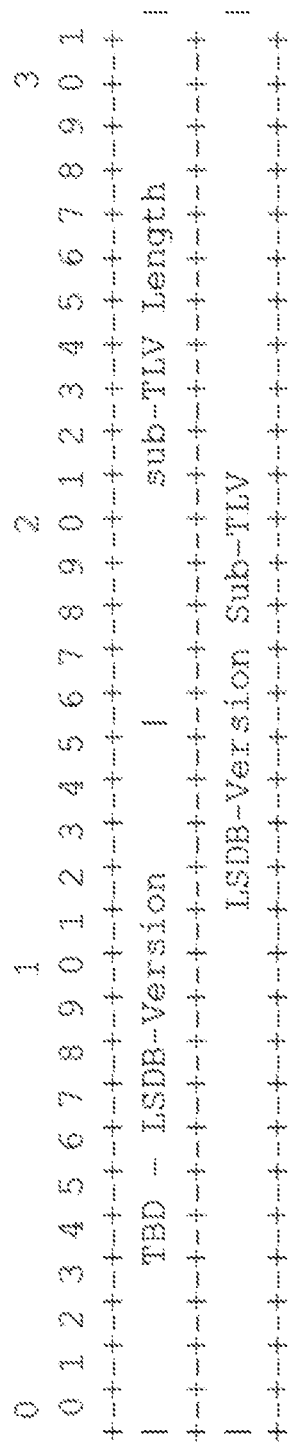
FIG. 5 is a schematic diagram of an encoding for transmitting link-state database delta synchronization information in accordance with embodiments of the present disclosure.

FIG. 5 is a schematic diagram of an example encoding 500 for transmitting link-state database delta synchronization information in accordance with embodiments of the present disclosure. The encoding 500 includes a type length variable (TLV) for the link state database version. This TLV could be included in OSPF LLS as described above and added to the link state updates.

It should be noted that the invention is not limited to OSPF.

Variations and Implementations

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment, The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the network service header features/operations thereof. This may be inclusive of appropriate algorithms and communication protocols that allow for the effective exchange of data or information.

In certain example implementations, the functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases or metadata disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, service nodes, etc.) can include memory elements for storing information to be used in achieving the features, as outlined herein. Additionally, each of these devices may include a processor that can execute software or an algorithm to perform the features as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations.

It is also important to note that the various steps described herein illustrate only some of the possible scenarios that may be executed by, or within, the nodes with capabilities described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by nodes with capabilities in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A computer-readable non-transitory medium comprising one or more instructions for synchronizing a link-state database, the instructions when executed on a processor are operable to:
   assign a version number to a version of a local link-state database of a network element;
   receive by the network element a request from a neighboring network element for an update to the neighboring network element's link-state database, the request comprising a version number for the last version of the local link-state database synchronized with the neighboring network element's link-state database;
   compare the version number of the version of the local link-state database with the version number for the last version of the local link-state database of the network element synchronized with the neighboring network element's link-state database;
   determine, based on the comparison, whether the last version of the local link-state database of the network element synchronized with the neighboring network element's link-state database is older or newer than the local link-state database;
   transmit, to the neighboring network element, one or more changes that have occurred in the local link-state database as compared to the last version of the local link-state database of the network element synchronized with the neighboring network element's link-state database if the last version of the local link-state database of the network element synchronized with the neighboring network element's link-state database is determined to be older than the local link-state database, and transmit to the neighboring network element the local link-state database in its entirety if the last version of the local link-state database of the network element synchronized with the neighboring network element's link-state database is determined to be newer than the local link-state database;
   retain a last-deleted link state database;
   maintain one or more last-deleted link state database elements for a predetermined time interval;
   store a version number for a link state database that included a most-recent last-deleted link state database element to time-out;
   determine that the last-deleted link state database element has timed-out based on the predetermined time interval for maintaining the last-deleted link state database element being elapsed;
   identify the version number of the database associated with the most-recent last-deleted link state database element to time-out;
   determine that the requested link-state database version is greater than the version number of the link state database associated with the most-recent last-deleted database element to time out; and
   transmit to the neighboring network element the one or more changes that have occurred in the local link-state database as compared to the last version of the local link-state database of the network element synchronized with the neighboring network element's link-state database.

2. The computer-readable non-transitory medium of claim 1, wherein the instructions when executed are further operable to:
   receive an update to the local link-state database;
   update the local link-state database with the update;
   increment the version number; and
   associate the version number with the updated local link-state database.

3. The computer-readable non-transitory medium of claim 1, wherein the instructions when executed are further operable to:
   determine that the last version of the local link-state database of the network element synchronized with the neighboring network element's link-state database is older than the local link-state database based on the version number associated with an updated local link-state database; and
   transmit the one or more changes to the neighboring network element based on the update.

4. The computer-readable non-transitory medium of claim 1, wherein the instructions when executed are further operable to:
   receive the request from the neighboring network element for the update to the neighboring network element's link-state database after an adjacency between the network element and the neighboring network element is lost.

5. The computer-readable non-transitory medium of claim 1, wherein the instructions when executed are further operable to:
update the version number in response to a change to the local link-state database.

6. A network element, the network element comprising:
at least one memory element having instructions stored thereon; and
at least one processors coupled to the at least one memory element and configured to execute the instructions to cause the network element to:
assign a version number to a version of a local link-state database of the network element;
receive a request from a neighboring network element for an update to the neighboring network element's link-state database, the request comprising a version number for the last version of the local link-state database synchronized with the neighboring network element's link-state database;
compare the version number of the version of the local link-state database with the version number for the last version of the local link-state database of the network element synchronized with the neighboring network element's link-state database;
determine, based on the comparison, whether the last version of the local link-state database of the network element synchronized with the neighboring network element's link-state database is older or newer than the local link-state database;
transmit, to the neighboring network element, one or more changes that have occurred in the local link-state database as compared to the last version of the local link-state database of the network element synchronized with the neighboring network element's link-state database if the last version of the local link-state database of the network element synchronized with the neighboring network element's link-state database is determined to be older than the local link-state database, and transmit to the neighboring network element the local link-state database in its entirety if the last version of the local link-state database of the network element synchronized with the neighboring network element's link-state database is determined to be newer than the local link-state database;
retain a last-deleted link state database;
maintain one or more last-deleted link state database elements for a predetermined time interval;
store a version number for a link state database that included a most-recent last-deleted link state database element to time-out;
determine that a last-deleted link state database element has timed-out based on the predetermined time interval for maintaining the one or more last-deleted link state database elements being elapsed;
identify the version number of the database associated with the most-recent last-deleted link state database element to time-out;
determine that the requested link-state database version is greater than the version number of the link state database associated with the most-recent last-deleted database element to time out; and
transmit to the neighboring network element the one or more changes that have occurred in the local link-state database as compared to the last version of the local link-state database of the network element synchronized with the neighboring network element's link-state database.

7. The network element of claim 6, wherein the instructions cause the network element to:
receive an update to the local link-state database;
update the local link-state database with the update;
increment the version number; and
associate the version number with the updated local link-state database.

8. The network element of claim 7, wherein the instructions cause the network element to:
determine that the last version of the local link-state database of the network element synchronized with the neighboring network element's link-state database is older than the local link-state database based on the version number associated with the updated local link-state database; and
transmit the one or more changes based on the update to the neighboring network element.

9. The network element of claim 6, wherein the instructions cause the network element to:
receive the request from the neighboring network element for the update to the neighboring network element's link-state database after an adjacency between the network element and the neighboring network element is lost.

10. A method performed at a network element, the method comprising:
assigning a version number to a version of a local link-state database of the network element;
receiving a request from a neighboring network element for an update to the neighboring network element's link-state database, the request comprising a version number for the last version of the local link-state database synchronized with the neighboring network element's link-state database;
comparing the version number of the version of the local link-state database with the version number for the last version of the local link-state database of the network element synchronized with the neighboring network element's link-state database;
determining, based on the comparing, whether the last version of the local link-state database of the network element synchronized with the neighboring network element's link-state database is older or newer than the local link-state database;
transmitting, to the neighboring network element one or more changes that have occurred in the local link-state database as compared to the last version of the local link-state database of the network element synchronized with the neighboring network element's link-state database if the last version of the local link-state database of the network element synchronized with the neighboring network element's link-state database is determined to be older than that of the local link-state database, and transmitting to the neighboring network element the local link-state database in its entirety if the last version of the local link-state database of the network element synchronized with the neighboring network element's link-state database is determined to be newer than the local link-state database;
retaining a last-deleted link state database;
maintaining one or more last-deleted link state database elements for a predetermined time interval;

storing a version number for a link state database that included a most-recent last-deleted link state database element to time-out;

determining that the last-deleted link state database has timed-out based on the predetermined time interval for maintaining the last-deleted link state database element being elapsed;

identifying the version number of the database associated with the most-recent last-deleted link state database element to time-out;

determining that the requested link-state database version is greater than the version number of the link state database associated with the most-recent last-deleted database element to time out; and transmitting to the neighboring network element the one or more changes that have occurred in the local link-state database as compared to the last version of the local link-state database of the network element synchronized with the neighboring network element's link-state database.

11. The method of claim 10, further comprising:
receiving an update to the local link-state database;
updating the local link-state database with the update;
incrementing the version number; and
associating the version number with the updated local link-state database.

12. The method of claim 11, further comprising:
determining that the last version of the local link-state database of the network element synchronized with the neighboring network element's link-state database is older than the local link-state database based on the version number associated with the updated local link-state database; and transmitting the one or more changes based on the update to the neighboring network element.

13. The method of claim 10, wherein the receiving the request from the neighboring network element for the update to the neighboring network element's link-state database is after an adjacency between the network element and the neighboring network element is lost.

14. The method of claim 10, further comprising updating the version number in response to a change to the local link-state database.

* * * * *

UNITED STATES PATENT AND TRADEMARK OFFICE
CERTIFICATE OF CORRECTION

PATENT NO. : 10,671,590 B2
APPLICATION NO. : 15/254943
DATED : June 2, 2020
INVENTOR(S) : Alfred C. Lindem et al.

Page 1 of 1

It is certified that error appears in the above-identified patent and that said Letters Patent is hereby corrected as shown below:

In the Claims

Claim 10, Column 14, Line 49, please replace "network element one or" with --network element, one or--

Signed and Sealed this
Twenty-ninth Day of September, 2020

Andrei Iancu
*Director of the United States Patent and Trademark Office*